United States Patent
Oda et al.

(10) Patent No.: US 8,505,283 B2
(45) Date of Patent: Aug. 13, 2013

(54) EXHAUST PURIFICATION DEVICE OF AN INTERNAL COMBUSTION ENGINE

(75) Inventors: Tomihisa Oda, Numazu (JP); Yoshitaka Nakamura, Toyota (JP); Shunsuke Toshioka, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 335 days.

(21) Appl. No.: 12/529,088

(22) PCT Filed: Dec. 26, 2008

(86) PCT No.: PCT/JP2008/073959
§ 371 (c)(1),
(2), (4) Date: Aug. 28, 2009

(87) PCT Pub. No.: WO2009/084728
PCT Pub. Date: Jul. 9, 2009

(65) Prior Publication Data
US 2010/0031641 A1    Feb. 11, 2010

(30) Foreign Application Priority Data
Dec. 27, 2007  (JP) ................................. 2007-337649

(51) Int. Cl.
*F01N 3/10*    (2006.01)
(52) U.S. Cl.
USPC .............................................. 60/295; 60/301
(58) Field of Classification Search
USPC .................................. 60/286, 295, 301, 303
See application file for complete search history.

(56) References Cited

U.S. PATENT DOCUMENTS

| | | | |
|---|---|---|---|
| 6,432,568 B1 * | 8/2002 | Salvador et al. | 429/423 |
| 2005/0207936 A1 | 9/2005 | Berryhill et al. | |
| 2007/0035832 A1 | 2/2007 | Hirata et al. | |

(Continued)

FOREIGN PATENT DOCUMENTS

| DE | 10 2005 012 393 A1 | 10/2005 |
|---|---|---|
| JP | 2003 314258 | 11/2003 |

(Continued)

OTHER PUBLICATIONS

Extended European Search Report issued Dec. 29, 2010 in EP 08 86 8704.

*Primary Examiner* — Thomas Denion
*Assistant Examiner* — Jonathan Matthias
(74) *Attorney, Agent, or Firm* — Oblon, Spivak, McClelland, Maier & Neustadt, L.L.P.

(57) ABSTRACT

An internal combustion engine, in which an $NO_X$ selective reducing catalyst (15) is arranged inside an engine exhaust passage, and aqueous urea stored in an aqueous urea tank (20) is fed to the $NO_X$ selective reducing catalyst (15) to selectively reduce the $NO_X$. The aqueous urea tank (20) comprises a main tank (20a) and a sub tank (20b) arranged inside the main tank (20a). The aqueous urea in the sub tank (20b) is sent to an aqueous urea feed valve (17). When the aqueous urea tank (20) should be refilled with aqueous urea, the sub tank (20b) is refilled with aqueous urea. It is detected by a level sensor (40) if the aqueous urea in the aqueous urea tank (20) is refilled. When it is judged that the $NO_X$ purification rate falls below an allowable level at the time of engine operation right after the aqueous urea in the aqueous urea tank (20) has been refilled, it is judged that the refilled aqueous urea is abnormal.

10 Claims, 5 Drawing Sheets

(56) References Cited

U.S. PATENT DOCUMENTS

| | | | |
|---|---|---|---|
| 2007/0079599 A1* | 4/2007 | Osaku et al. ............. | 60/283 |
| 2007/0157602 A1* | 7/2007 | Gschwind ................. | 60/274 |
| 2008/0034732 A1 | 2/2008 | Hosoya et al. | |
| 2008/0178575 A1* | 7/2008 | Shaikh et al. ............. | 60/274 |
| 2009/0078692 A1* | 3/2009 | Starck ..................... | 219/260 |

FOREIGN PATENT DOCUMENTS

| | | |
|---|---|---|
| JP | 2005 83223 | 3/2005 |
| JP | 2005 127256 | 5/2005 |
| JP | 2005 282413 | 10/2005 |
| JP | 2006 2663 | 1/2006 |
| JP | 2006 9606 | 1/2006 |
| WO | WO 2007017080 A1 * | 2/2007 |

* cited by examiner

Fig.6 though the inside of the EGR passage 21. In the embodiment shown in FIG. 1, the engine cooling water is guided to the inside of the cooling device 23 where the engine cooling water is used to cool the EGR gas.

EXHAUST PURIFICATION DEVICE OF AN INTERNAL COMBUSTION ENGINE

TECHNICAL FIELD

The present invention relates to an exhaust purification device of an internal combustion engine.

BACKGROUND ART

In an exhaust purification device of an internal combustion engine arranging an $NO_X$ selective reducing catalyst in an engine exhaust passage and feeding aqueous urea stored in an aqueous urea tank into the $NO_X$ selective reducing catalyst so as to selectively reduce the $NO_X$ contained in the exhaust gas with the ammonia generated from the aqueous urea, known in the art is internal combustion engine arranging an aqueous urea concentration sensor in the aqueous urea tank for detecting abnormalities in the aqueous urea (for example, see Japanese Patent Publication (A) No. 2005-83223).

However, this aqueous urea concentration sensor is expensive. Currently, it is desired to use a more inexpensive alternative method.

DISCLOSURE OF THE INVENTION

An object of the present invention is to provide an exhaust purification device able to detect an abnormality in aqueous urea inexpensively and reliably.

According to the present invention, there is provided an exhaust purification device of an internal combustion engine in which an $NO_X$ selective reducing catalyst is arranged in an engine exhaust passage and aqueous urea stored in an aqueous urea tank is fed into the $NO_X$ selective reducing catalyst to selectively reduce $NO_X$ contained in an exhaust gas with ammonia generated from the aqueous urea, wherein the aqueous urea tank comprises a main tank and a sub tank arranged inside the main tank and smaller than the main tank and communicating with the inside of the main tank, aqueous urea inside the sub tank being sent to an aqueous urea feed valve, aqueous urea being refilled in the sub tank when the aqueous urea tank should be refilled with aqueous urea, and aqueous urea refill judging means for judging if aqueous urea has been refilled in the aqueous urea tank and $NO_x$ purification rate judging means for judging if the $NO_x$ purification rate has fallen below an allowable level are provided, it being judged that a refilled aqueous urea is abnormal when it is judged that the $NO_x$ purification rate has fallen to below the allowable level at the time of engine operation right after the aqueous urea tank has been refilled with aqueous urea.

In this regard, abnormality of the aqueous urea, that is, a drop in concentration of the aqueous urea, mainly occurs for example when nonstandard aqueous urea is refilled or a liquid other than aqueous urea is refilled. On the other hand, a drop in concentration of the aqueous urea is expressed as a drop in the $NO_X$ purification rate at the time of engine operation. In this regard, in the present invention, aqueous urea is refilled inside the sub tank and the aqueous urea inside the sub tank is fed from the aqueous urea feed valve, therefore the aqueous urea refilled right after the refilling of the aqueous urea is fed from the aqueous urea feed valve. Therefore, it is possible to reliably detect abnormality of the aqueous urea from a drop in the $NO_X$ purification rate at the time of engine operation right after the aqueous urea is refilled and therefore possible to reliably detect abnormality of the aqueous urea by an inexpensive method.

BEST MODE FOR CARRYING OUT THE INVENTION

Figure 1:
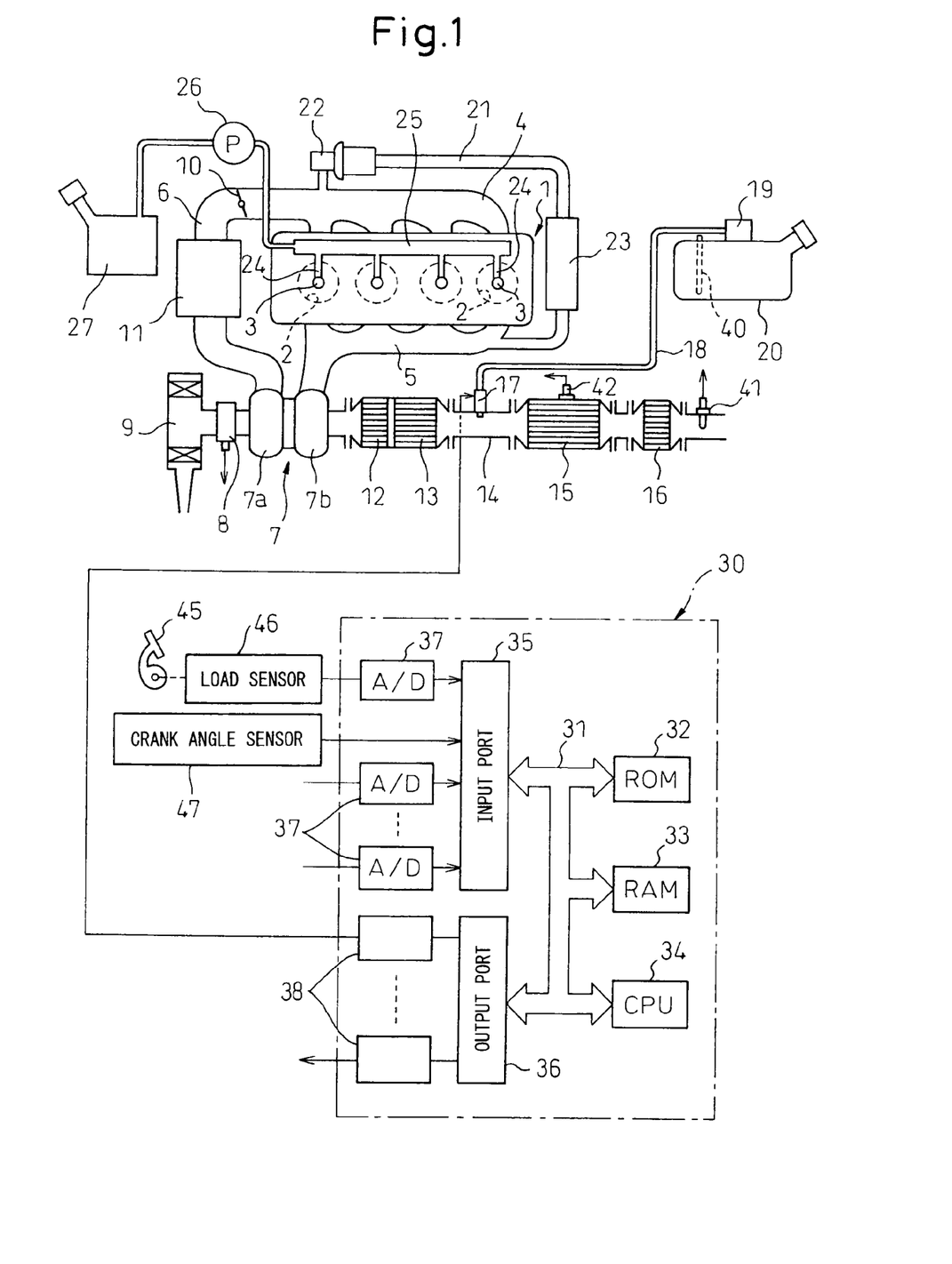
FIG. 1 is an overview of a compression ignition type internal combustion engine.

FIG. 1 shows an overview of a compression ignition type internal combustion engine.

Referring to FIG. 1, 1 indicates an engine body, 2 a combustion chamber of a cylinder, 3 an electronic control type fuel injector for injecting fuel into each combustion chamber 2, 4 an intake manifold, and 5 an exhaust manifold. The intake manifold 4 is connected through an intake duct 6 to the outlet of a compressor 7a of an exhaust turbocharger 7, while the inlet of the compressor 7a is connected through an intake air amount detector 8 to an air cleaner 9. Inside the intake duct 6, a throttle valve 10 driven by a step motor is arranged. Further, around the intake duct 6, a cooling device 11 for cooling the intake air flowing through the inside of the intake duct 6 is arranged. In the embodiment shown in FIG. 1, the engine cooling water is guided to the cooling device 11 where the engine cooling water cools the intake air.

On the other hand, the exhaust manifold 5 is connected to the inlet of an exhaust turbine 7b of the exhaust turbocharger 7, while the outlet of the exhaust turbine 7b is connected to the inlet of an oxidation catalyst 12. Downstream of the oxidation catalyst 12, a particulate filter 13 is arranged adjacent to the oxidation catalyst 12 for collecting particulate matter contained in the exhaust gas, while the outlet of this particulate filter 13 is connected through an exhaust pipe 14 to the inlet of an $NO_X$ selective reducing catalyst 15. The outlet of this $NO_X$ selective reducing catalyst 15 is connected to an oxidation catalyst 16.

Inside an exhaust pipe 14 upstream of the $NO_X$ selective reducing catalyst 15, an aqueous urea solution feed valve 17 is arranged. This aqueous urea solution feed valve 17 is connected through a feed pipe 18 and a feed pump 19 to an aqueous urea solution tank 20. The aqueous urea solution stored inside the aqueous urea solution tank 20 is injected by the feed pump 19 into the exhaust gas flowing within the exhaust pipe 14 from the aqueous urea solution feed valve 17, while the ammonia $((NH_2)_2CO+H_2O \rightarrow 2NH_3+CO_2)$ generated from urea causes the $NO_X$ contained in the exhaust gas to be reduced in the $NO_X$ selective reducing catalyst 15. As illustrated in FIG. 1, a level sensor 40 able to detect the level of the liquid surface of the aqueous urea solution in the aqueous urea solution tank 20 is arranged in the aqueous urea solution tank 20. This level sensor 40 produces an output which is proportional to the level of the liquid surface of the aqueous urea solution in the aqueous urea solution tank 20.

The exhaust manifold 5 and the intake manifold 4 are connected to each other through an exhaust gas recirculation (hereinafter referred to as the "EGR") passage 21. Inside the EGR passage 21 is arranged an electronic control type EGR control valve 22. Further, around the EGR passage 21 is arranged a cooling device 23 for cooling the EGR gas flowing through the inside of the EGR passage 21. In the embodiment shown in FIG. 1, the engine cooling water is guided through the cooling device 23, where the engine cooling water is used to cool the EGR gas. On the other hand, each fuel injector 3 is connected through a fuel feed pipe 24 to a common rail 25. This common rail 25 is connected through an electronically controlled variable discharge fuel pump 26 to a fuel tank 27. The fuel stored in the fuel tank 27 is fed by the fuel pump 26 into the common rail 25, and the fuel fed to the inside of the common rail 25 is fed through each fuel pipe 24 to the fuel injectors 3.

In addition, in the present invention, $NO_X$ purification rate judging means for judging whether or not the $NO_X$ purification rate is lowered below an allowable level is provided and, in the embodiment illustrated in FIG. 1, this $NO_X$ purification rate judging means is comprised of a $NO_X$ sensor 41 arranged downstream of the oxidation catalyst 16. This $NO_X$ sensor 41 produces an output which is proportional to the $NO_X$ concentration in the exhaust gas.

An electronic control unit 30 is comprised of a digital computer provided with a ROM (read only memory) 32, RAM (random access memory) 33, CPU (microprocessor) 34, input port 35, and output port 36 all connected to each other by a bi-directional bus 31. The output signals of the level sensor 40, the $NO_X$ sensor 41 and intake air amount detector 8 are input through corresponding AD converters 37 into the input port 35. On the other hand, the accelerator pedal 45 has a load sensor 46 generating an output voltage proportional to the amount of depression L of the accelerator pedal 45 connected to it. The output voltage of the load sensor 46 is input through a corresponding AD converter 37 to the input port 35. Further, the input port 35 has a crank angle sensor 47 generating an output pulse each time the crank shaft rotates by for example 15° C. connected to it. On the other hand, the output port 36 is connected through corresponding drive circuits 38 to the fuel injection 3, throttle valve 10 drive step motor, aqueous urea solution feed valve 17, feed pump 19, EGR control valve 22, and fuel pump 26.

The oxidation catalyst 12 carries a precious metal catalyst such as for example platinum. This oxidation catalyst 12 performs an action of converting the NO contained in the exhaust gas to $NO_2$ and an action of oxidizing the HC contained in the exhaust gas. Namely, $NO_2$ has an oxidizing ability stranger than NO. Accordingly, if NO is converted to $NO_2$, the oxidation reaction of the particulate matters trapped on the particulate filter 13 is promoted, and the reducing action on the $NO_X$ selective reducing catalyst it by ammonia is promoted.

A particulate filter not carrying a catalyst may be used as the particulate filter 13. For example, a particulate filer carrying a precious metal catalyst such as platinum may be used. Further, the $NO_X$ selective reducing catalyst 15 may be comprised of ammonia adsorption type of Fe zeolite having a high $NO_X$ purification rate at low temperatures or a titania vanadium based catalyst having no adsorbing function of ammonia. The oxidation catalyst 16, for example, carries a precious metal catalyst consisting of platinum. This oxidation catalyst 16 performs an action oxidizing ammonia leaked from the $NO_X$ selective reducing catalyst 15.

Figure 2:
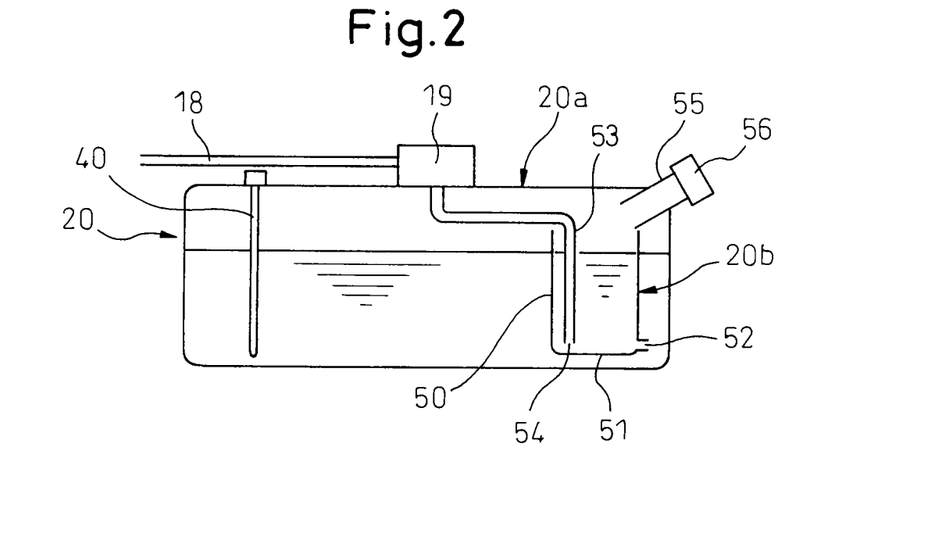
FIG. 2 is an enlarged view of an aqueous urea tank.

FIG. 2 shows an enlarged view of the aqueous urea tank 20 shown in FIG. 1. As shown in FIG. 2, in an embodiment of the present invention, the aqueous urea tank 20 comprises a main tank 20a and a sub tank arranged inside the main tank 20a and smaller than the main tank 20a and communicating with the inside of the main tank 20a. This sub tank 20b is formed inside a cylindrically shaped body 50 extending upward from the bottom inside the main tank 20a. The top of this cylindrically shaped body 50 is open inside the main tank 20a, while the bottom end of the cylindrically shaped body 50 is closed by a bottom wall 51. Accordingly, in the embodiment shown in FIG. 2, the sub tank 20b has a cup shape.

As shown in FIG. 2, at the bottom of the sub tank 20b, a small diameter communication hole 52 is formed. The inside of the sub tank 20b is communicated with the inside of the main tank 20a through the communication hole 52 formed at the bottom of the sub tank 20b. In order to send the aqueous urea inside the sub tank 20b to the aqueous urea feed valve 17, an aqueous urea suction pipe 53 of the feed pump 19 extends downward inside the sub tank 20b. A tip 54 of this aqueous urea suction pipe 53, that is, an inlet port 54 for the aqueous urea sent to the aqueous urea feed valve 17, is arranged at the bottom of the sub tank 20b.

On the other hand, as shown in FIG. 2, an aqueous urea refill pipe 55 for refilling aqueous urea inside the main tank 20a is attached at a top corner part of the main tank 20a. The inner end of this aqueous urea refill pipe 55 is open at the top of the sub tank 20b toward the inside of the sub tank 20b. When the aqueous urea tank 20 should be refilled with the aqueous urea, a cap 56 attached at the outer end of the aqueous urea refill pipe 55 is removed, and new aqueous urea in the sub tank 20b is refilled through the aqueous urea refill pipe 55. That is, in the present invention, when the aqueous urea tank 20 should be refilled with aqueous urea, the sub tank 20b is refilled with aqueous urea.

In the example shown in FIG. 2, a level sensor 40 for detecting the liquid level of the aqueous urea is arranged at the inside of the main tank 20a. As opposed to this, in the example shown in FIG. 3, the level sensor 40 is arranged inside the sub tank 20b.

Now, as explained above, abnormalities of the aqueous urea mainly occur for example when a nonstandard aqueous urea is used or a liquid other than an aqueous urea is illicitly used. On the other hand, the $NO_X$ purification rate at the time of engine operation can be detected by an inexpensive method. Therefore, in the present invention, aqueous urea refill judging means for judging if the aqueous urea has been refilled in the aqueous urea tank and $NO_X$ purification rate judging means for judging if the $NO_X$ purification rate has fallen to below an allowable level are provided and it is judged that the refilled aqueous urea is abnormal when it is judged that the $NO_X$ purification rate has fallen below an allowable level at the time of engine operation right after the aqueous urea tank has been refilled with aqueous urea.

In this case, in an embodiment of the present invention, the liquid level of the aqueous urea in the aqueous urea tank 20 is detected by the level sensor 40, and it is judged that the aqueous urea has been refilled when the liquid level of the aqueous urea rises from below a predetermined low level and exceeds a predetermined refill completion level.

Next, the aqueous urea refilling judgment routine for judging if aqueous urea has been refilled will be explained with reference to FIG. 4. In the example shown in FIG. 4, when the liquid level in the aqueous urea tank 20 has fallen below a predetermined low level, a low level flag is set based on the output signal of the level sensor 44. At step 60, it is judged if this low level flag is set. When the low level flag is set, the routine proceeds to step 61 where it is judged by the level sensor 44 if the liquid level has exceeded a refill completion level SX where it is estimated that refill has been completed. When the liquid level has exceeded the refill completion level SX, the routine proceeds to step 62. That is, when the previously low level liquid level rises over the refill completion level, it is believed that the aqueous urea has been refilled during that time, so the routine proceeds to step 62 where it is judged that the aqueous urea has been refilled.

Figure 5:
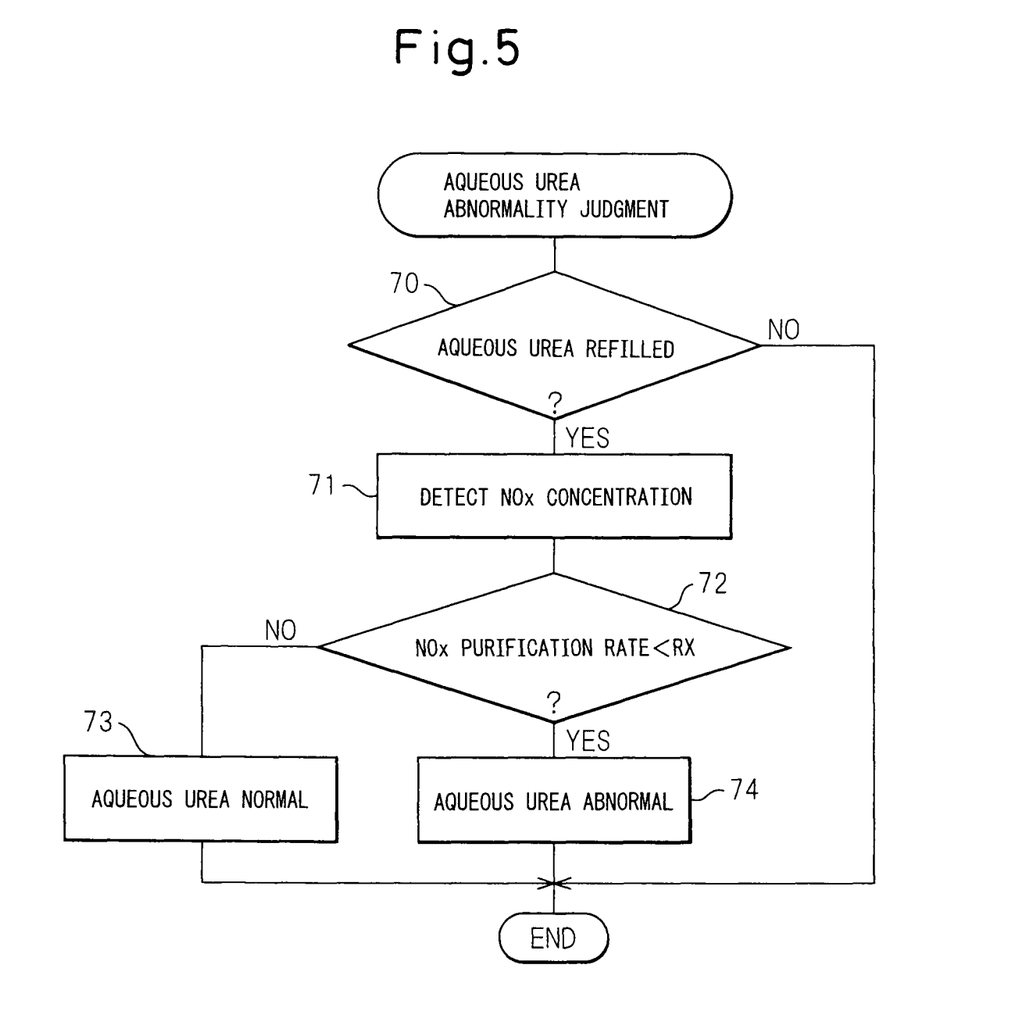
FIG. 5 is a flow chart for judging if the aqueous urea is abnormal.

FIG. 5 shows the routine for judgment of abnormality of the aqueous urea executed when the engine starts operating.

Figure 4:
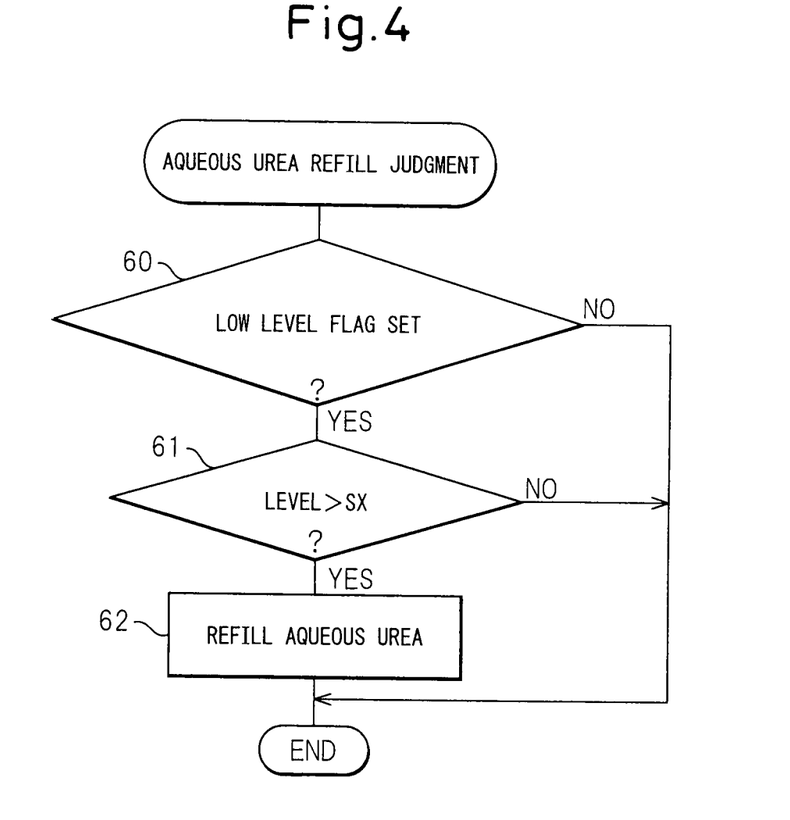
FIG. 4 is a flow chart for judging if the aqueous urea is refilled.

Referring to FIG. 5, first, at step 70, it is judged based on the judgment result by the routine shown in FIG. 4 if the aqueous urea has been refilled. When the aqueous urea has been refilled, the routine proceeds to step 71 where the $NO_X$ concentration in the exhaust gas is detected by the $NO_X$ sensor 41.

For example, if nonstandard low concentration aqueous urea is refilled or a liquid with a weak reducing force other than aqueous urea is refilled, the $NO_X$ purification rate in the $NO_X$ selective reducing catalyst 15 will fall, so the $NO_X$ concentration in the exhaust gas guided to the $NO_X$ sensor 41 becomes higher. Therefore, in an embodiment of the present invention, it is judged that the aqueous urea is abnormal when it is judged from the detection value of the $NO_X$ sensor 41 that the $NO_X$ purification rate has fallen below a predetermined allowable level RX.

Figure 6:
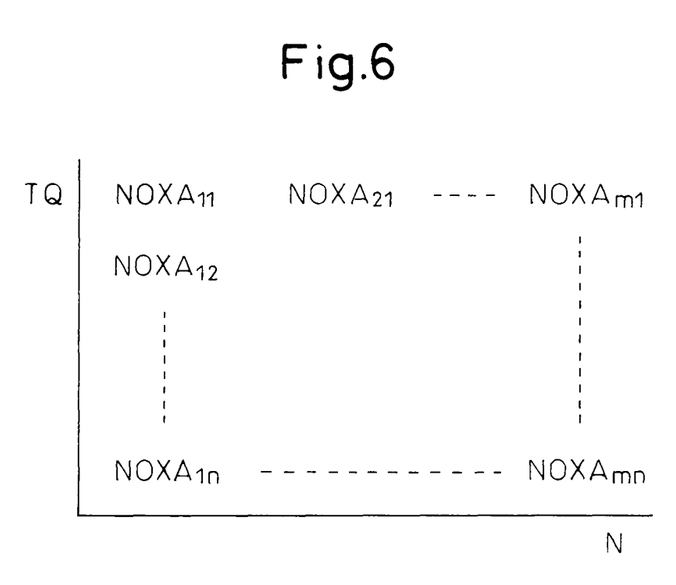
FIG. 6 is a view showing a map of the $NO_X$ amount NOXA exhausted per unit time from the engine.

Explaining this in a bit more detail, in an embodiment according to the present invention, the $NO_X$ amount NOXA exhausted per unit time from the engine is stored in advance as a function of the output torque TQ of the engine and the engine speed N in the form of a map as shown in FIG. 6 in the ROM 32. When the $NO_X$ concentration is detected by the $NO_X$ sensor 41 at step 71, the $NO_X$ purification rate in the $NO_X$ selective reducing catalyst 15 is calculated from the exhaust $NO_X$ amount NOXA from the engine calculated from the map shown in FIG. 3 and the outflow $NO_X$ amount from the $NO_X$ selective reducing catalyst 15 calculated from the $NO_X$ concentration detected by the $NO_X$ sensor 41 and the intake air amount.

If the $NO_X$ purification rate is calculated, at step 72, it is judged if the $NO_X$ purification rate is below the allowable level RX. At this time, if $NO_X$ purification rate$\geq$RX, the routine proceeds to step 73, where it is judged that the aqueous urea is normal. If at this time $NO_X$ purification rate<RX, the routine proceeds to step 74 where it is judged that the aqueous urea is abnormal. In this way, it is detected if the aqueous urea is abnormal.

As explained above, in the present invention, the aqueous urea for refilling is fed into the sub tank 20*b*. At this time, even if some amount of aqueous urea remains in the sub tank 20 prior to refilling, this remaining aqueous urea is pushed out by the refilled aqueous urea through the communication hole 52 into the main tank 20*a*. As a result, the inside of the sub tank 20*b* is filled with the post-refilling aqueous urea. Therefore, the post-refilling aqueous urea is fed from the aqueous urea feed valve 17 when an abnormality judgment is performed on the aqueous urea from the output value of the $NO_X$ sensor 41. Therefore, it is possible to reliably judge if the post-refilling aqueous urea is abnormal.

Figure 3:
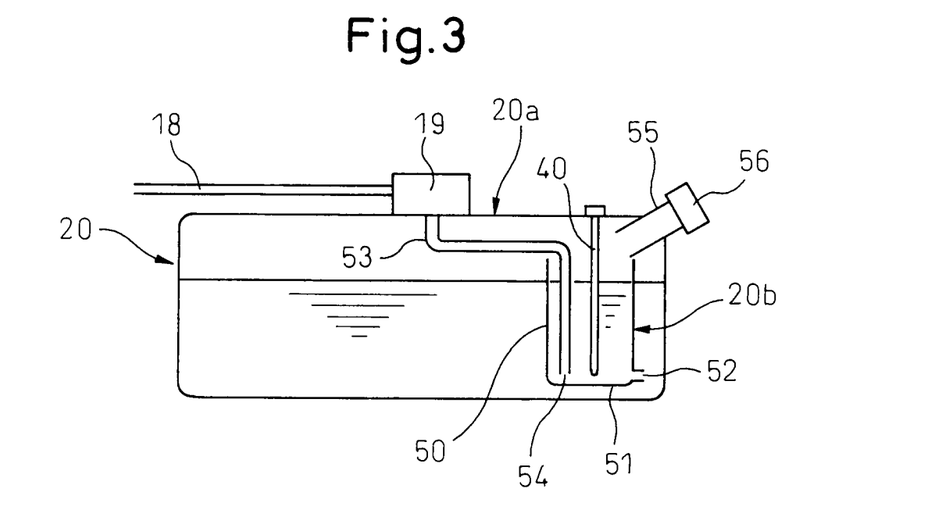
FIG. 3 is an enlarged view of another embodiment of an aqueous urea tank.

Further, the aqueous urea in the sub tank 20*b* only flows out in small amounts through the communication hole 52 into the main tank 20*a*, so when the action of refilling the aqueous urea is performed, the liquid level in the sub tank 20*b* will be higher than the liquid level in the main tank 20*a*. That is, even if the refilling amount of the aqueous urea is not that high, the liquid level in the sub tank 20*b* will be high. Therefore, arranging the level sensor 40 in the sub tank 20*b*, as shown in FIG. 3, has the advantage of enabling detection by the level sensor 40 that aqueous urea has been refilled even when the refilling amount of the aqueous urea is not that high.

LIST OF REFERENCES

4 . . . intake manifold
5 . . . exhaust manifold
12, 16 . . . oxidation catalyst
13 . . . particulate filter
15 . . . $NO_X$ selective reducing catalyst
17 . . . aqueous urea feed valve
20 . . . aqueous urea tank
20*a* . . . main tank
20*b* . . . sub tank
40 . . . level sensor
41 . . . $NO_X$ sensor
52 . . . communication hole
55 . . . aqueous urea refill pipe

The invention claimed is:

1. An exhaust purification device of an internal combustion engine, comprising:
    a $NO_X$ selective reducing catalyst in an engine exhaust passage; and
    an aqueous urea tank that stores aqueous urea fed into the $NO_X$ selective reducing catalyst to selectively reduce $NO_X$ contained in an exhaust gas with ammonia generated from the aqueous urea, the aqueous urea tank including a main tank and a sub tank arranged inside the main tank and smaller than the main tank;
    aqueous urea refill judging means for judging if aqueous urea has been refilled in the aqueous urea tank;
    $NO_X$ purification rate judging means for judging if $NO_X$ purification rate has fallen below an allowable level;
    a control unit configured to judge that a refilled aqueous urea is abnormal when it is judged that the $NO_X$ purification rate has fallen to below the allowable level at the time of engine operation right after the aqueous urea tank has been refilled with aqueous urea;
    a communication hole formed in the bottom end of the sub tank that continuously communicates an inside of the sub tank with an inside of the main tank; and
    an aqueous urea feed valve in the exhaust passage, upstream of the $NO_X$ selective reducing catalyst, that feeds the aqueous urea to the $NO_X$ selective reducing catalyst,
    wherein a top end of the sub tank is open within the main tank and a bottom end of the sub tank is closed by a bottom wall,
    wherein an inner end of an aqueous urea refill pipe attached to the main tank is open towards the inside of the sub tank to feed the refilled urea into the sub tank, and
    wherein an inlet for aqueous urea fed into the aqueous urea feed valve is arranged at a bottom of the sub tank.

2. An exhaust purification device of an internal combustion engine as claimed in claim 1,
    wherein the sub tank is formed inside a cylindrically shaped body extending upward from a bottom of the main tank inside the main tank.

3. An exhaust purification device of an internal combustion engine as claimed in claim 1, wherein a liquid level of the aqueous urea in the aqueous urea tank is detected by a level sensor and the control unit is configured to judge that the aqueous urea has been refilled when the liquid level of the aqueous urea rises from below a predetermined low level and exceeds a refill completion level.

4. An exhaust purification device of an internal combustion engine as claimed in claim 3, wherein the level sensor that detects the liquid level of the aqueous urea is arranged inside the sub tank and the liquid level detected by the level sensor is a liquid level of the sub tank.

5. An exhaust purification device of an internal combustion engine as claimed in claim 1, wherein
    the refilled urea flows from the sub tank to the main tank via the communication hole.

6. An exhaust purification device of an internal combustion engine as claimed in claim 1, wherein the bottom wall of the sub tank is separated from a bottom surface of the main tank.

7. An exhaust purification device of an internal combustion engine as claimed in claim 1, wherein refilled urea is fed from the refill pipe to the sub tank,
wherein a liquid level of the refilled urea in the sub tank is detected by a level sensor and the control unit is configured to judge that a refill operation is complete when the liquid level of the refilled urea rises from below a predetermined low level and exceeds a refill completion level, and
wherein the level sensor that detects the liquid level of the refilled urea is arranged inside the sub tank and the liquid level detected by the level sensor is a liquid level of the sub tank.

8. An exhaust purification device of an internal combustion engine, comprising:
a $NO_X$ selective reducing catalyst in an engine exhaust passage; and
an aqueous urea tank that stores aqueous urea fed into the $NO_X$ selective reducing catalyst to selectively reduce $NO_X$ contained in an exhaust gas with ammonia generated from the aqueous urea, the aqueous urea tank including a main tank and a sub tank arranged inside the main tank and smaller than the main tank;
a level sensor that detects aqueous urea has been refilled in the aqueous urea tank;
a $NO_x$ sensor that detects if a $NO_x$ purification rate has fallen below an allowable level;
a control unit configured to judge that a refilled aqueous urea is abnormal when it is judged that the $NO_x$ purification rate has fallen to below the allowable level at the time of engine operation right after the aqueous urea tank has been refilled with aqueous urea;
a communication hole formed in the bottom end of the sub tank that continuously communicates an inside of the sub tank with an inside of the main tank; and
an aqueous urea feed valve in the exhaust passage, upstream of the $NO_X$ selective reducing catalyst, that feeds the aqueous urea to the $NO_X$ selective reducing catalyst,
wherein a top end of the sub tank is open within the main tank and a bottom end of the sub tank is closed by a bottom wall,
wherein an inner end of an aqueous urea refill pipe attached to the main tank is open towards the inside of the sub tank to feed the refilled urea into the sub tank, and
wherein an inlet for aqueous urea fed into the aqueous urea feed valve is arranged at a bottom of the sub tank.

9. An exhaust purification device of an internal combustion engine as claimed in claim 8, wherein
the refilled urea flows from the sub tank to the main tank via the communication hole.

10. An exhaust purification device of an internal combustion engine as claimed in claim 8, wherein refilled urea is fed from the refill pipe to the sub tank,
wherein a liquid level of the refilled urea in the sub tank is detected by the level sensor and the control unit is configured to judge that a refill operation is complete when the liquid level of the refilled urea rises from below a predetermined low level and exceeds a refill completion level, and
wherein the level sensor that detects the liquid level of the refilled urea is arranged inside the sub tank and the liquid level detected by the level sensor is a liquid level of the sub tank.

* * * * *